(12) United States Patent
Guruprasad (10) Patent No.: US 7,002,927 B2
(45) Date of Patent: Feb. 21, 2006

(54) SELF-SCALING NETWORK

(75) Inventor: Venkata Guruprasad, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 09/919,735

(22) Filed: Aug. 1, 2001

(65) Prior Publication Data

US 2003/0076825 A1   Apr. 24, 2003

(51) Int. Cl.
*H04L 12/28* (2006.01)

(52) U.S. Cl. .................... 370/255; 370/397; 370/395.2

(58) Field of Classification Search ........ 370/254–255, 370/351, 370, 377, 399, 401, 409, 396–397, 370/238, 395.2, 395.7; 709/241
See application file for complete search history.

(56) References Cited

U.S. PATENT DOCUMENTS 5,274,643 A * 12/1993 Fisk ........................... 370/238
6,069,889 A * 5/2000 Feldman et al. ............. 370/351
6,163,543 A * 12/2000 Chin et al. ................... 370/400
6,278,714 B1 * 8/2001 Gupta ......................... 370/422
6,353,593 B1 * 3/2002 Chen et al. ................. 370/216
6,501,754 B1 * 12/2002 Ohba et al. ................. 370/389
6,683,874 B1 * 1/2004 Nagami et al. ............. 370/392
6,717,944 B1 * 4/2004 Bryden et al. .............. 370/392
6,920,141 B1 * 7/2005 Gupta et al. ........... 370/395.53

* cited by examiner

Primary Examiner—Ricky Ngo
Assistant Examiner—Nittaya Juntima
(74) Attorney, Agent, or Firm—F.Chau & Associates, LLC (57) ABSTRACT

According to an embodiment of the present invention, a method is provided for automatic aggregation of a plurality of virtual paths emanating from a first switch. The method includes automatically discovering and identifying portions of the virtual paths that run parallel to one another, e.g., through the same set of switches up to a common terminating switch at which the paths diverge or terminate, as a candidate path set for aggregation, constructing a tunnel path along this set of paths all the way between the first switch and the terminating switch, and aggregating the parallel portions identified by the path set into the tunnel.

19 Claims, 6 Drawing Sheets

Initial path bundles

Fig. 1: Initial path bundles

Fig. 2: After the longest bundle aggregation

Fig. 3: After a trailing bundle aggregation

Fig. 4: After a tunnel concatenation

Fig. 5: After super-tunnel aggregation

Fig. 6: After all possible aggregations

Fig. 7: Association signalling

Fig. 8: Aggregation signalling - 1/2

Fig. 9: Aggregation signalling - 2/2

Fig. 10: Finalisation signalling - 1/2

Fig. 11: Finalisation signalling - 2/2

Fig. 12: Reverse Finalisation - 1/2

Fig. 13: Reverse finalisation - 2/2

Fig. 14: Downstream release - 1/3

Fig. 15: Downstream release - 2/3

Fig. 16: Downstream release - 3/3

SELF-SCALING NETWORK

BACKGROUND OF THE INVENTION

1. Field of the Invention

The present invention relates to computer communication and networking, and more particularly to the layering of packet labels in label switched (virtual path) networks to reduce the size of switching tables.

2. Brief Description of the Prior Art

A problem in connection-oriented networks, in which the connections are provided in the form of virtual circuits or paths, is the build up of "connection state" information, including path table entries, within the switches of the network. In contrast, routing in the Internet, using Internet Protocol (IP) addresses, is "stateless" as it uses bits of the destination IP address carried in each packet to look up the next hop in a route table, thus hierarchically interpreting the address. However, virtual paths, also called label-switched paths, have an inherent advantage over IP routing in that the paths are not bounded, in length or number, by the size of the path index or label space. This advantage is generally unavailable because a global address space was needed for defining the connection in the first place and limited the number of destinations anyway. Another advantage, particularly exploited in asynchronous mode transfer (ATM), is that it is much easier to guarantee quality of service (QoS) using virtual paths (VPs).

Methods for efficient setup for virtual circuits (VCs) with a guaranteed worst case bound and without dependence on a global network address space like IP, is described in copending U.S. Pat. No. 6,802,068, entitled "Addressless Internetworking", filed July 1999, herein incorporated by reference in its entirety. The method exploits a hierarchical name service resembling the Domain Name Service (DNS), but are constructed in a way that makes it simultaneously a spanning tree and allows control routing by interpreting names as addresses. It is expected that existing routing protocols, including those presently used in the Internet, can be adapted to exploit the name service for obtaining unique switch (router) identifiers for use in computing optimal routes. The switch state volume is then an important remaining problem to be solved for scalability to the Internet scale.

The magnitude of the switch state problem can be estimated as follows. The size of the path table in a typical switch in a connection-oriented network would be M, where M is the mean number of connections passing through that switch, which may be thought of as the density of connections. M would be limited to approximately 10,000, for efficiency and performance. In IP, the number of routes depends on the total number of nodes N in the network, rather than a similar notion of node density, but unlike virtual path indices, IP addresses are interpreted in the course of routing. For example, had the IP (version 4) address space been perfectly aggregated, the entire IP route table would have been simply a distributed binary tree, and the routing decision could have been reduced to 1 bit per router, for a table size of 2 entries and total depth of 32 levels. In reality, IP address assignments have been far from perfect: the initial partitioning of the address space in terms of classes ensured a route table size of at least 256 entries, corresponding to $(2^{log\ N})^{1/4} = N^{1/4}$, and the tables have been further enlarged by Classless Inter-Domain Routing (CIDR), as noted in the Internet Engineering Task Force (IETF) Request for Comments document RFC2775. There is however, a need for a comparable reduction of switch state volume before connection-oriented networking can become usable on the Internet scale.

One proposed method for dealing with switch state volume is the Multi-Protocol Label Switched (MPLS) architecture, providing for the recursive aggregation of aggregate virtual paths, allowing path labels to be nested in the form of a "label stack". Although the feature appears to be motivated more for switching speed and QoS management, it permits an exponential number of connections to be accommodated at each switch and would reduce the switch state volume to log M. The result would be superior to unaggregated IP in scalability, assuming $\log M < N^{1/d}$, since the size of the Internet, N, will be greater than the capacity of any one switch, M.

The recursive aggregation is also advantageous from another perspective: the aggregate paths, or tunnels, become progressively less representative of actual connections as the level of aggregation increases, and may be considered to represent the state of usage of the network, just as the IP route table is representative of the network topology. Higher level aggregates are likely to be remain useful longer than the individual connections. However, MPLS does not provide a way to guarantee the state reduction on a global scale, as the path labels serve as addresses within MPLS clouds and extending the label space to cover the Internet would reinvent the IP addresses. On the other hand, the labels can be kept local to the individual switches as long as a global address space exists for defining the connections, as provided in ATM. The label stack would then need to be applied on unlimited scale, and it is desirable to perform the aggregation without involving the address space.

Another advantage of aggregation is that it also reduces the signaling latency, because whenever a path is to be created (or destroyed) within an existing tunnel, a setup (teardown) signal does not need to be processed at the intermediate switches traversed by the tunnel. This would eliminate signaling traffic to the intermediate switches whenever broadside-on signaling is used.

Yet another advantage is that with recursive aggregation, connection-oriented networking can provide an indefinitely scalable long term architecture for the Internet as follows. The present IP routing scheme, despite its $N^{1/d}$ scalability of routing, suffers from the inherent bound imposed by its finite address space. There is no way to avoid this limitation other than to widen the packet headers periodically, which is quite difficult as shown by the ongoing IPv6 migration effort, or to make the packet header format independent of the network size, which implies use of relative addressing in some form. Dynamic relative addressing using maps was proposed in the Nimrod scheme (RFC1992) and a more static relative addressing scheme using network address translations (NAT) is proposed in a paper entitled "IPNL: A NAT-Extended Internet Architecture" at SIGCOMM'01. Virtual paths achieve relative addressing on a finer per-switch level of granularity than these methods, and connection-oriented networking is thus a candidate for future long term Internet architecture.

Therefore, a need exists for making connection-oriented networking scalable to the Internet scale and beyond, which can be satisfied only with a means for automatic recursive aggregation of virtual paths.

SUMMARY OF THE INVENTION

Accordingly, an object of this invention is to provide a method for reducing the switching table sizes within a switched network, thereby ensuring good switching performance even at high loads. A further object is to allow this reduction to be applied automatically and periodically, so as to keep the switching table sizes optimal as the pattern of connections evolves. A related object is to reduce the setup latencies along frequently used path segments within switched networks. An additional object is to ensure indefinite scalability in a network. A related object is to provide indefinite scalability in a network without manual maintenance. A further related object is to provide a permanent end-to-end networking solution for the Internet.

These purposes, as well as others which will be apparent, are achieved in the present invention by providing for an association means to determine a set of virtual paths emanating from a given first switch that would be productively aggregated into a tunnel, and a related aggregation means for setting up a tunnel path all the way from the first switch for the length of the path set and aggregating each of the paths within the path set into the tunnel. The present invention provides an optional tunnel merge means for combining tunnels without nesting when they go the same way for the same distance, an optional tunnel release means for restoring the individual paths when the tunneled set falls below a threshold, and an optional tunnel concatenation means for linking two tunnels when one of them begins at the same switch at which the other terminates, provided that the outbound tunnel carries all of the paths coming from the other.

According to an embodiment of the present invention, a method is provided for automatic aggregation of a plurality of virtual paths emanating from a first switch. The method includes automatically discovering and identifying portions of the virtual paths that run parallel to one another, e.g., through the same set of switches up to a common terminating switch at which the paths diverge or terminate, as a candidate path set for aggregation, constructing a tunnel path along this set of paths all the way between the first switch and the terminating switch, and aggregating the parallel portions identified by the path set into the tunnel.

Discovery of the parallel portions for their identification as a candidate path set comprises the steps of first selecting, at the first switch, an initial set of paths emanating from the first switch to a common second switch, issuing a control signal message, called association signal and bearing a list of indices of the paths included in the initial path set, at the first switch to the second switch, propagating the association signal at the second and each of zero or more successive switches commonly traversed by the path set until more than a specified minimum number of the paths diverge from the initial path set, and finally identifying the remainder of the path set as the candidate set and the final switch reached as the terminating switch for the set. The method further includes deleting the indices of the diverged paths from the list of indices, incrementing a forward hop count included in the association signal at each of the successive switches, and initiating tunnel path construction if the final value of the forward hop count at the terminating switch is above a specified minimum.

Constructing the tunnel path comprises the steps of allocating a new path table entry for the tunnel at the terminating switch, composing at the terminating switch a response signal message, called aggregation signal, bearing the final forward hop count and the list of path indices received in the aggregation signal, a list of outgoing path indices corresponding to the received list, and a reverse hop count initialized to zero, and propagating the aggregation signal in reverse through each of the preceding switches in succession until it reaches the first switch. The method further comprises incrementing the reverse hop count at each of the successive switches on this reverse traversal to determine arrival at the first switch by comparing the reverse hop count with the final forward hop count, performing at each switch a reverse lookup of the first list of indices received in the aggregation signal to identify the corresponding incoming virtual paths at that switch and replacing the received first list of indices with the identified corresponding list, allocating at each switch a new path table entry for the tunnel, assigning the received extra index as the outgoing index and the next switch from which the aggregation signal was received as the next switch for this new entry, replacing the received extra index with the index of this new entry, and finally, initiating aggregation of the candidate set of paths into the constructed tunnel upon arrival at the first switch.

Aggregation comprises the steps of allocating at the first switch a new path table entry for the tunnel and marking the path table entries corresponding to the first list of indices received in the aggregation signal as redirected to this new tunnel path, replacing the outgoing indices for the marked entries with the corresponding indices from the second list received in the aggregation signal, composing a third signal message, called aggregation finalization signal, bearing the same first list of indices, the received final forward hop count and the received reverse hop count, and propagating this aggregation finalization signal through each of the successive switches once again till the terminating switch. Aggregation further comprises replacing the received list of indices with corresponding outgoing indices and discarding the path table entries identified by the received list of indices at each successive switch other than the terminating switch, thereby effecting a reduction of the path table size representing the state volume at that switch.

The parallel portion discovery, tunnel construction and path aggregation are performed recursively treating the tunnels as candidates for further aggregation, as well as periodically in order to maintain the overall degree of aggregation and table size reduction as the virtual path connections are closed and new ones opened by the end system applications. Additionally, if the network includes an onward tunnel at the terminating switch to which all of the virtual paths emerging from the constructed first tunnel are redirected at the terminating switch, the latter may instead mark the first tunnel as itself redirected into the outgoing tunnel and discarding the entries for the emerging paths, thereby concatenating the onward tunnel to the constructed first tunnel, reducing its own path table size, and avoiding the overheads of decapsulation and encapsulation for these paths. A related optimization available in the method is to save the reverse hop count at each of the intermediate switches and the first switch as a measure of the length of the remaining portion of the tunnel, avoid constructing the tunnel path if the candidate set of paths are determined to be tunnels of equal length by the saved hop counts, and instead of aggregating them once again, to merge them starting at the first switch by redirecting the second and remaining tunnels in the candidate path set to the first.

The method additionally includes, for the case of two-way connections represented by pairs of virtual paths in opposite directions, the optional steps of allocating at each intermediate switch a second path table entry for the reverse tunnel, initiating aggregation of the reverse paths at the terminating switch by issuing a reverse finalization signal message bearing the list of indices for the reverse paths, and propagating this reverse finalization signal all the way back to the first switch in analogous manner.

A release signal, releasing aggregated paths from a tunnel path, is initiated upon determining that a switch issuing the release signal, a peer switch connected to the switch issuing the release signal by a tunnel released, and each intermediate switch have path table space to accommodate a plurality of component paths individually. The release signal includes an outgoing index for a tunnel path, a list of outgoing indices for a plurality of component paths, and an indication whether the first tunnel is to be discarded after the release.

According to an embodiment of the present invention, a method is provided for automatic release of aggregated paths from a tunnel path on determining at the tunnel entry switch that each intermediate switch traversed by the tunnel path has path table space for accommodating each of the aggregated paths individually. The method comprises the steps of initiating at the tunnel entry switch a release signal comprising a list of outgoing indices of the virtual paths that are initially redirected to the tunnel at the entry switch, propagating the release signal successively to each switch along the tunnel path, allocating at each of the successive switches a path table entry for each index listed in the release signal and setting the outgoing index and next switch for that entry with the listed index and the next switch on the tunnel path, respectively, returning an acknowledgment signal to the preceding switch from which the release signal was received, the acknowledgment signal comprising the received list together with the list of indices of the allocated path table entries in the same order, and at the preceding switch, replacing the outgoing index for each path table entry identified by the first list in the received acknowledgment with the corresponding index from the second list in the acknowledgment signal. The method further comprises including an optional discard indication flag in the release signal, and deallocating the tunnel path table entry at each of the successive switches in the event that the discard indication flag is set.

According to an embodiment of the present invention, an alternative method is provided for automatic release of aggregated paths from a tunnel path, on similarly determining at the tunnel exit switch that each intermediate switch traversed by the tunnel path has path table space to accommodate each of the aggregated paths individually. The method comprises the steps of initiating at the tunnel exit switch a reverse release signal comprising a list of incoming path indices for the virtual paths emerging from the tunnel, propagating the reverse release signal successively to each preceding switch along the tunnel path, and allocating at each of the preceding switches except the tunnel entry switch a path table entry for each index listed in the reverse release signal and setting the outgoing index and next switch for that entry with the listed index and the next switch on the tunnel path, respectively. The method further comprises including an optional discard indication flag in the reverse release signal, returning the discard indication flag in an acknowledgment signal to the next switch from which the reverse release signal was received, and deallocating at the next switch the tunnel path table entry on receipt of this indication in the acknowledgment signal.

According to an embodiment of the present invention, a switched network comprising a plurality of switches and providing a plurality of virtual path connections passing from a first switch through at least one intermediate switch and to a terminating switch, wherein at least one of the switches initiates automatic discovery and aggregation of parallel portions of the virtual paths into at least one tunnel.

BRIEF DESCRIPTION OF THE DRAWINGS

Other objects, variations, features and advantages of the present invention will be apparent when the detailed description of the preferred embodiments are considered in conjunction with the drawings, which should be construed in an illustrative and not limiting sense as follows.

DETAILED DESCRIPTION OF PREFERRED EMBODIMENTS

The present invention provides for an association means to determine a set of virtual paths emanating from a given first switch that would be productively aggregated into a tunnel, and a related aggregation means for setting up a tunnel path all the way from the first switch for the length of the path set and aggregating each of the paths within the path set into the tunnel. The present invention provides an optional tunnel merge means for combining tunnels without nesting when they go the same way for the same distance, an optional tunnel release means for restoring the individual paths when the tunneled path set falls below a threshold, and optional tunnel concatenation means for linking two tunnels when one of them begins at the same switch at which the other terminates, provided the outbound tunnel carries all of the paths coming from the other.

More particularly, the association means envisaged in the present invention involves a control signal message issued by the first switch to a neighboring switch or host, the message bearing a forward hop count and a list of outgoing virtual path indices corresponding to a set of virtual paths going to that neighboring switch or host. The first switch examines its list of virtual paths, and bundles them into separate path sets according to their next hop destination and quality of service and related parameters. The first switch selects the set including the most paths, and applies the association signal to this set by signaling to the same next hop destination with the forward hop count initialized to zero. The signal is propagated over successive hops the same way, each switch incrementing the forward hop count, replacing each of the incoming path indices with the corresponding outgoing ones, and forwarding the signal to the next hop destination. If some paths in the set turn out to have a different next hop destination than the rest, the path set is treated as split into subsets, each subset having a unique next hop destination. The switch where the split occurs may propagate the signal along one or more of the subsets, appropriately reducing the included list of path indices for each. If the path set drops below a first predefined size threshold in terms of the number of paths contained, exceeds an optionally predefined length or delay limit, or reaches a boundary beyond which the signaling protocol is not supported or otherwise permitted, the association signal is stopped and the path set is deemed to be terminated at that switch. If the length of the path set, defined by the final forward hop count, is above a predefined threshold, a tunnel path is set up between the first and the terminating switches, along the path defined by the path set, and each of the paths in the set is then gathered into the tunnel, reducing the path set to a single, aggregate path between the two switches. The first switch may issue association signals over its list of outgoing path sets, reducing them in succession until no path set remains above the first size threshold, and may repeat the bundling and the signaling periodically as the connections in the network evolve.

The method may be independently applied at multiple switches, including at the intermediate switches, where the previously aggregated paths would be counted as individual paths, in order to identify and aggregate shorter, thicker super path sets. At an intermediate switch, it is possible that an outbound tunnel already caters to the full set of paths emerging from an incoming tunnel, in which case, the switch can avoid the decapsulation and re-encapsulation load for these paths by concatenating the two tunnels, and deleting the path table entries corresponding to the component paths. Additionally, newer connections along existing tunnels may be established directly as tunneled paths using tunneled setup means. As the active connections terminate, reducing the aggregated paths to below a second predefined size threshold, the remaining aggregated paths may be released by regenerating their path table entries in the en route switches, and the (empty) tunnel then destroyed, to avoid the cost of encapsulation and decapsulation at the tunnel end point switches.

Limiting the number of distinct path labels at each switch to a logarithm of the number of connections passing through that switch improves the scalability of the network. The tradeoff is that the label stack also increases logarithmically, using up more bandwidth, and each level of nesting also adds additional latency and processing overhead at the tunnel entrances and exits. The advantages and tradeoffs are as envisaged in the MPLS prior art, but according to the present invention, the aggregation is performed automatically and is capable of operating on much larger scales and with finer granularity. Further, by automatically providing tunneled signaling over frequently used route segments, to avoid the path setup computations altogether at the intermediate switches, both the individual path setup latency and the switch load are reduced. Numerous variations are envisaged and allowed for in the present invention. For example, the length of the threshold should be least two hops to provide any advantage at all, and would be typically set to a larger number representing the best tradeoff for the performance gain at the intermediate switches against the encapsulation-decapsulation overhead at the tunnel entrance and exit. The first size threshold would be typically set to a number larger than two to offset the cost of tunnel setup and aggregation. The second size threshold would be generally set lower than the first and can be as low as one, to mean that the tunneled paths never be released, although the encapsulation-decapsulation delays and the incremental transmission delay due to the additional labels in these paths. As this could be of concern to the applications using them, the second size threshold may be set differently depending on the service parameters of the path set. The association may be performed by examining the full route information of each of the paths, if available at the first switch, for example, in the form of a designated transit list (DTL), which is computed in the source routing scheme described in the ATM Private Network-Node Interface (PNNI) specification. This is not a general method, not only because it depends on the use of PNNI, but also because the DTL is expensive to store and reacquiring it by querying the switches would incur additional end-to-end two-way network delays. The association signal appears to be both simpler and more general, being applicable even in addressless networks where no end-to-end addresses are available for the computation of DTLs.

The related method of aggregation envisaged in the present invention involves a response signal message issued by the terminating switch of the association signal to the preceding switch on the latter's path, the message bearing an optional reverse hop count initialized to zero and an extra virtual path index, together with the final forward hop count, the list of virtual path indices received in the association signal, and a list of outgoing path indices corresponding to the received list. The terminating switch manufactures the extra index by allocating a virtual path table entry to be used as the tunnel path for the path set, before sending the aggregation signal to the preceding switch. The preceding switch performs a reverse-lookup in its virtual path table for each of the indices in the first list in the received signal, building up a corresponding list of indices to be passed in turn to its predecessor, allocates a new path table entry for the tunnel, entering in it the received extra index as the onward index and the next switch as the next hop destination, replaces the received extra index field in the signal with the index of this new entry, increments the reverse hop count field if present, and lastly, propagates the aggregation signal onwards to its predecessor along the same path. The signal, still bearing the final hop count, is propagated this way, creating the tunnel, all the way back to the first switch, which too performs a reverse-lookup to identify the path table entries corresponding to the path set. If the final forward hop count satisfies the predefined length threshold, the first switch may initiate the actual aggregation by allocating a new path table entry for the tunnel and entering in it the received extra index as the onward index and the next switch as the next hop destination, marking each of the identified path table entries as redirected to this tunnel index, replacing the outgoing indices for the redirected entries with the corresponding indices in the second list received in the aggregation signal, and returning the first list in the received signal once again in yet another control signal message, called the aggregation finalization signal, to the next switch. The latter first looks up each of the indices once again in order to build up the corresponding index list to be in turn passed to its successor, deletes the looked up path table entries since they are no longer needed, and passes the signal onwards; the procedure is repeated at each switch until the signal reaches the terminating switch and is simply discarded.

Note that each switch needs to determine whether a received aggregation signal is in response to an association signal it had itself originated, which would make it the designated first switch for that signal. This can be achieved by including the reverse hop count in the signal as described and comparing it with the forward hop count: the forward and reverse hop counts would match only at the first switch, unless either of the hop count fields rolled over, which can be prevented by treating the maximum representable hop count as an implicit length limit and terminating the association signal when the forward hop count happens to reach this value. One of ordinary skill in the art will appreciate that other methods for making the determination are possible without departing from the scope of the present invention, such as including a unique id of the first switch in the association signal to be returned unmodified with the aggregation signal in place of the reverse hop count. The advantage of using the reverse hop count lies in not depending on a global id space of the switches, which can impose administrative and maintenance problems and can be avoided in addressless internetworking.

It may be observed that the aggregation signal in effect acknowledges the association signal, which itself makes no changes to the path tables in any of the switches. There is no harm, therefore, if the terminating switch is unable to respond: the first switch can reissue the association signal after a suitable interval. In turn, the aggregation signal weaves a new tunnel backwards to the first switch, but again makes no destructive change to the switch path tables. A failure during the aggregation signaling would render the incomplete tunnel useless, and the latter must be eventually discarded, possibly in response to an error notification from the point of failure, but the paths in the path set would be unaffected. Should a failure occur during the finalization signal, there would again be no immediate irreparable harm, as the redirections would have been completed at the first switch.

As with the association, it is eminently possible, within the scope of this invention, to employ other means for the aggregation, so long as it is automated and coupled to an association means. The aggregation and finalization signals and their processing comprise one means, but that several details need be considered. For example, while the terminating switch is able to identify the reverse link to its predecessor from the link on which it received the association signal, this capability is not similarly available to the preceding switches including the first switch, and may have to be provided via the aggregation signal. This can be achieved without imposing state at the switches by having each intermediate switch to append reverse linkage information to the association signal, building up a path stack to be popped once at each step on the way back with the aggregation signal. This can be bad for very long path sets, but there is at least a second reason that the path set lengths to be kept small, so that the length of the path stack should not be a problem in practice.

If the path set splits and the association signal propagates over multiple sub path sets simultaneously, multiple aggregation signals will eventually return to the first switch, where the path set's list of indices would be correspondingly split, but since the subsets would be disjoint, there is no danger of collision in the aggregation process, and no extra state is needed.

If a given set of paths is very large, it may become necessary to split it into subsets. Multiple tunnels would result to the same destination, to be aggregated in a subsequent association sweep. It would be wasteful to involve one more level of aggregation for these parallel tunnels, as each level imposes additional encapsulation and decapsulation overhead at the tunnel entry and exit. The foregoing procedure can be adapted to merge such tunnels instead as follows: from the forward hop count returned in the aggregation signal, the first switch learns the path length of every tunnel thus constructed; if a subsequently received aggregation signal identifies two or more tunnels of equal lengths, they can be merged. The first switch identifies all path table entries that were directed to these tunnels, relinks them to the new tunnel, adds the onward indices of the emptied tunnel entries to the finalization signal, deletes the emptied tunnel entries and finally, sends the finalization signal on its way.

The relinking includes finding path table entries not identified by the aggregation signal, however, much of the computation would have been already performed before issuing the association signal, because for efficient bundling, the first switch would have set up a linked list of path sets for each next hop switch, with each path set containing a linked list of path table entries designated for that switch, incurring a constant setup cost for each new path. Only the paths that are already linked to tunnels identified in the returned aggregation signal may need to be relinked, so that by associating a separate list of path table entries for each tunnel, and at each aggregation, moving the aggregated path entries from a path set list to the corresponding tunnel list, the precise lists of path entries to be relinked would be automatically available at the time of merging. Identification of merger candidates can be made efficient as well by keeping the tunnel entries within each switch list, and the tunnel indices in each of the signals, contiguous, so that non-tunnel indices would not have to be examined. This saves work because in principle, a path is identifiable as a tunnel only at the entry and the exit switches, the tunnel indices for a given next hop switch refer only to tunnels originating at the given switch, and the tunnels are likely to be few in number.

Considering another case, viz when a path set being associated and aggregated already passes through a tunnel, so that none of the association, aggregation and finalization operations would be performed at the intermediate switches, but the procedure needs to handle the fact that the next hop destination and the preceding switch references in the affected path table entries refer to the tunnel path at the entry and exit switches, respectively. In the association signaling, it is immaterial whether the hop destinations refer to tunnels or to switches, but express comparison may be needed for each case depending on the data representation and the coding style. Likewise, in the aggregation signaling, the reverse lookup may reveal a tunnel exit instead of a preceding switch, but at the other end of the tunnel, it does not matter if the received list of indices includes tunneled paths, so no special handling is needed. The association sweeps can therefore be safely initiated by both edge and backbone switches in any order.

A related issue is that path deletions proceeding downstream can interfere with the association and aggregation process. Deletion is very likely to be a quicker operation as it typically involves a single path, hence a deletion signal could overtake an association signal bearing the index of the deleted path, which could get reallocated to a different path by the time the association signal arrived at a downstream switch. At the first switch, a path index included in an association signal could get deleted and reallocated before the aggregation response signal arrived. In both cases, naive execution of the aggregation process would break the new path at its point of divergence from the path set. Even if the new path happened to follow the same route all the way, its service parameters could be incompatible with the path set. One way to prevent such divergence is to make the combined association and aggregation process atomic with respect to deletions by holding the latter off until the current association-aggregation process is over.

For this, the first switch needs to know whether aggregation signals are outstanding on a given path. Additionally, deletions going upstream can arrive at an intermediate switch between the association and the aggregation response signals, and multiple association-aggregation signals could arrive simultaneously for a given set of paths, but it would be disastrous if any of these got interleaved as well. Deletions and the combined association-aggregation processes must be serialized, therefore, and can be queued at equal priority. Further, since the finalization signal does not return an acknowledgment, the aggregation would be considered complete while the finalization is in progress downstream, so it is important to prevent inband deletion signals going downstream from getting ahead of the finalization signals. A deletion signal headed upstream that arrives during the finalization process can interfere only at the switch where the two signals meet, in which case, it is only necessary to ensure that the path index is not reassigned in-between the two deletions.

The method can potentially hold up deletions too long, starving the switches of path indices, which can happen, for example, when a path set traverses geostationary satellite links, when a switch or a link fails, or when the network is as such congested, slowing the association and aggregation processing. One solution is to keep the predefined length or delay limit short and to have the terminating switch initiate onward association and aggregation for the same path set separately. Once the onward tunnel is set up, the switch can then concatenate the two tunnels as already described, so that the association and aggregation process in effect proceeds incrementally along the path set. Note that this also eliminates the potential problem of long path stacks building up in the association signals.

To be considered is the case when the path set and an included tunnel path end in the same switch, because the path set can then be merged with this tunnel, as the requisite decapsulations are already established at the current switch. The advantage is that in the finalization pass, the paths already in the tunnel would not need to be relinked and there would be no empty tunnel to be deleted; these optimizations are automatically available if a separate paths lists is maintained for each tunnel, as described.

Note that the above case is different from that of paths joining a given path set at an intermediate switch. If the intermediate switch issues an association signal for this extended path set, a tunnel will be automatically created, by the foregoing procedure, for the remaining length of the path set, but this is no more than the first switch scenario already considered, because the outgoing virtual paths were not assumed to begin from it. A more pertinent issue is whether an association signal from upstream would interfere with the association and aggregation initiated by the intermediate switch. If the upstream initiated association arrives first, the original path set would get aggregated into a tunnel, leading to the previous special case. On the other hand, if the intermediate switch happens to initiate the association signal first, the larger downstream path set would be aggregated first, so that when the upstream initiated association signal arrives, it would list path indices already redirected to a tunnel at the intermediate switch, which should presumably terminate the arriving association and return an aggregation response. For efficiency, however, it may return the existing downstream tunnel index as the extra index in the aggregation signal, thereby concatenating the new aggregation to the onward tunnel in the same step and extending the latter backwards. Tunnels can thus be grown, and even branched, in the backward direction.

The above aggregation procedure is lossless because the individual paths remain operational while the aggregation signal propagates back, and the aggregation is finalized from the source side of these paths towards their tail ends. If some packet loss could be tolerated in each of the component paths, which is often the case, the procedure could be optimized for speed by having the terminating switch return essentially the aggregation signal but with a different command code instructing the preceding switches to discard the path table entries right away, in order to obviate the finalization pass. A minor optimization would also become available in this lossy case, viz that at each intermediate switch, one of the path table entries could be simply reused for the tunnel path entry. However, the freed indices could get reallocated before the aggregation signal reaches the first switch, making it unacceptably unsafe to forward packets between sending of the association signal and receipt of the aggregation signal, so the first switch must block transmission on these paths before sending the association signal, which is more drastic than deferring path deletions. Furthermore, the lossy case is not robust against switch or link failures, as there would be no way to recover the deleted path table entries at the intermediate switches. The lossless procedure is therefore preferred.

A similar signaling procedure is envisaged for the optional tunnel release, to be initiated by the tunnel entry or exit switches, since these are the only ones where the path table entries exist for both the tunnel and its component paths. The release signal would be initiated when one of these switches determined, via other signaling means, that it, its peer and the intermediate switches all had adequate path table space to accommodate some of the component paths individually and that it would be meaningful to avoid the corresponding encapsulation-decapsulation overheads. If the entry switch made the determination, it would issue the release signal, bearing the tunnel path's outgoing index, a list of outgoing indices for the component paths, and an indication whether the tunnel is to be discarded after the release, to the next hop switch identified by the tunnel path entry. Note that the listed indices would have no corresponding path table entries at the intermediate switches, and the tunnel discard indication is needed because the intermediate switches cannot determine whether the tunnel would be emptied following the release and qualified for deletion. Accordingly, on receiving this signal, the next switch synthesizes a new path table entry for each listed component path index, linking it to the tunnel as the outgoing port and storing the received index as the outgoing path index for that entry. The switch returns the indices to the newly created path table entries as a list in its acknowledgment to the first switch, together with the discard indication, and forwards the release signal unchanged to the next switch on the tunnel path. On receiving the acknowledgment, the first switch first delinks the component paths from the tunnel by setting the next switch as the onward link for each of these paths, replaces the outgoing indices with the corresponding ones received in the acknowledgment signal, and finally, deletes the tunnel path entry if so indicated in the acknowledgment signal. The process continues with each switch passing on the release signal, returning an acknowledgment to the preceding switch, and responding to the acknowledgment from the next switch, until the release signal arrives at the tunnel exit switch. Here, no new path table entries are allocated, since the component path table entries already exist and are identified by the indices in the received signal. Accordingly, this list of indices is returned intact to the preceding switch in acknowledgment.

The method can be modified when the tunnel release is issued by the tunnel exit switch and propagated upstream, to handle the case where the exit switch provides its incoming indices for both the tunnel and its component paths. On receiving the release signal, each preceding switch in turn allocates a new path table entry for each received index, stores the received index as the outgoing index for the new entry, and replaces the received index in the signal with the incoming index for the new entry. the exit switch then returns the discard indication as acknowledgment to the next switch so that the latter can discard the tunnel path entry if so indicated, does a reverse lookup on the received tunnel index and replaces it in the release signal with its own incoming index for the tunnel path, and forwards the release signal with the modified list to its own predecessor switch in the tunnel path. The method terminates when the tunnel entry switch returns the acknowledgment to the next switch, and discards its own path table entry for the tunnel per the indication received with the release signal.

Additionally, it is useful to route new virtual paths directly through existing tunnels, instead of relying on the association-aggregation process, as this would avoid setup and teardown operations at the intermediate switches. Accordingly, the dynamic aggregations are made known to the route computation process, but assuming that the needed mechanism exists, it is straightforward to construct inband or out-of-band setup signaling procedures for setting up tunneled virtual paths.

Since bi-directional connections are typically provided by pairs of virtual paths going each way, the foregoing procedures would be separately applicable each way. However, it may be desirable to make the two-way aggregations symmetric, so that both tunnels should be created in the same signaling procedure. As each tunnel is best created with the corresponding acknowledgment return, the reverse tunnel cam be constructed with the finalization signal, needing an additional reverse finalization signal to complete the aggregation of the reverse paths. One alternative would be to construct it with the association signal, but this would entail tearing down the reverse tunnel path if the path set length turns out to be insufficient. The reverse finalization pass is simpler and preserves the robustness and losslessness of the one-way path aggregation process.

According to the modified finalization method, the first switch identifies the reverse path entries and appends their outgoing indices as a list to the finalization signal. It then allocates a path table entry for the reverse tunnel and inserts its index as a second extra index in the signal. At the intermediate switches, the forward path table entries get deleted as before, but in addition, each intermediate switch allocates a second new path table entry for the reverse tunnel, inserting in it the received extra index as the onward path index, replaces the second extra index with the index to this new entry in the signal message, does a reverse lookup for the received list of reverse path indices, assembling a list of the corresponding incoming indices, replaces the received list with the assembled list, and passes the finalization signal onwards. When the terminating switch receives the signal, it initiates the actual aggregation of the reverse paths by similarly allocating a new path table entry for the reverse tunnel, doing a reverse lookup for the received list of reverse path indices and relinking the identified path table entries to the reverse tunnel entry, and issuing a reverse finalization signal comprising the list of outgoing indices for the looked up reverse paths to the preceding switch. On receiving the reverse finalization signal, the preceding switch first looks up each of the received indices and stores the corresponding onward indices in a new list, deletes the path table entries, and replaces the received list of indices with the new list, and passes the signal onwards to the next switch on the reverse path. The procedure is repeated until the signal arrives at the first switch, where it can be finally discarded.

An additional advantage with two-way paths is that the path stack can be replaced with the incoming path index of a single reverse path in the association and aggregation signals, because the reverse path suffices to identify the predecessor switch all the way. Each intermediate switch then needs to update this reverse path index at each step, performing a reverse lookup of the received reverse path index and replacing it with the incoming index so found during the association signaling. In the aggregation response process, the reverse path index is looked up both to fetch the corresponding onward index and to identify the preceding switch to send the onward response to.

The corresponding scenario for symmetric release of bi-directional connections is equivalent to a combination of the upstream and downstream path release scenarios described above, since the tunnel entry switch in either direction is also the exit switch for the reverse paths. A simple combination of the signaling procedures is therefore adequate for this purpose.

The automatic aggregations envisaged in the present invention are independent of bandwidth reduction in any form, and are important, for example, for optical switches, whose switching patterns can be changed only slowly compared to the bandwidth.

An additional significance of the present invention concerns the operating system analogy made in the copending application, wherein prior art networking was likened to real memory addressing on primitive host platforms and addressless networking was equated with the virtual memory addressing in newer operating systems like UNIX. The present invention may be correspondingly thought of as a virtual memory (swap space) management scheme designed for scalability, particularly since the tunnel release and merge operations, to be described, are somewhat reminiscent of garbage collection and the coalescing of virtual memory blocks.

A preferred embodiment is now described with reference to a sample network shown in FIG. 1, comprising switches [800] through [806] with a number of virtual paths over the physical links between them. A total of 6 paths go from switch [800] to switch [801], from which three diverge at switch [801], one to switch [810] and the other two to switch [812], leaving three paths continuing onto switch [802], and so on.

Figure 2:
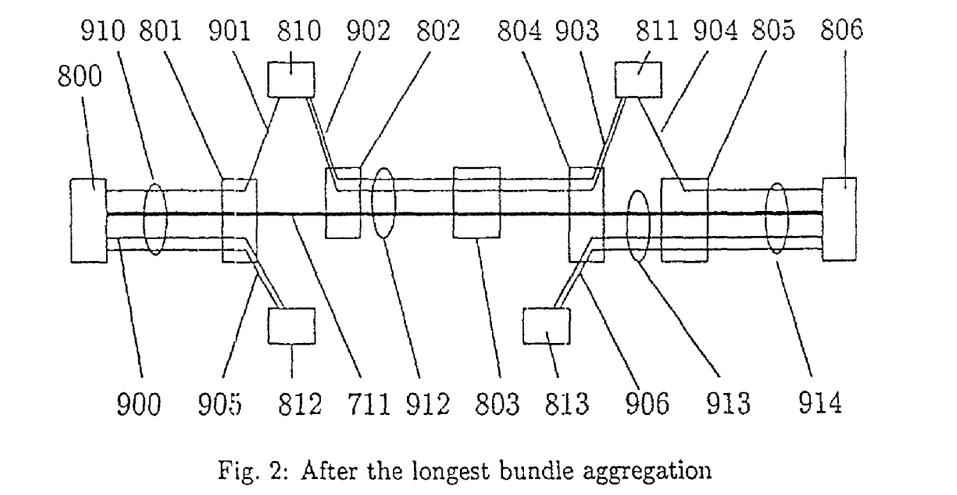
FIG. 2 shows the virtual paths of the network of FIG. 1 after one round of association signaling and tunnel capture, according to an embodiment of the present invention.

FIG. 2 illustrates the result of one round of association signaling by the leftmost switch [800] for the set of paths [910], which splits at switch [801] into the subsets [901] proceeding to switch [810], [905] to switch [812], and [911] to switch [802]. Assume first that the network is configured to continue association signaling only for the longest subset after each split. In that case, when switch [801] receives the association signal, it drops the smaller subsets [901] and [905], and forwards the association signal to switch [802] only for the largest subset [911]. This subset continues without further splits all the way to the rightmost switch [806]. It can be further assumed, without loss of generality, that switch [806] terminates the signaling procedures of the present invention, because if there are switches to the right of switch [806] to which the signaling can be continued, the termination considerations to be described would be instead applicable to the last of those switches. Switch [800] is thus the first switch, i.e. the issuing switch, for the association signal and switch [806] is the terminating switch. The composition and handling of the signal messages will be described after first examining the intended effect of the association-aggregation process.

The association signal passes through the successive switches [802] through [805] with no further splits, and arrives at switch [806], which returns a corresponding aggregation signal, bearing a new path index for a tunnel path [711] as response to switch [805]. This aggregation signal is passed backwards all the way, generating corresponding path table entries for tunnel [711] at each of the intermediate switches [805] through [801], until it arrives at the first switch [800]. The latter also creates a path table entry for tunnel [711], redirects the subset [911] to this tunnel, and issues a finalization signal to the next switch [801]. The finalization signal again propagates all the way to the terminating switch [806], resulting in the deletion of the subset path entries at the intermediate switches [801] through [805]. The result is a single path [711] running from switch [800] to switch [806] that carries the combined traffic of the original subset [911], and a corresponding reduction of the number of paths handled at each of the intermediate switches [801] through [805], as depicted in FIG. 2.

Figure 1:
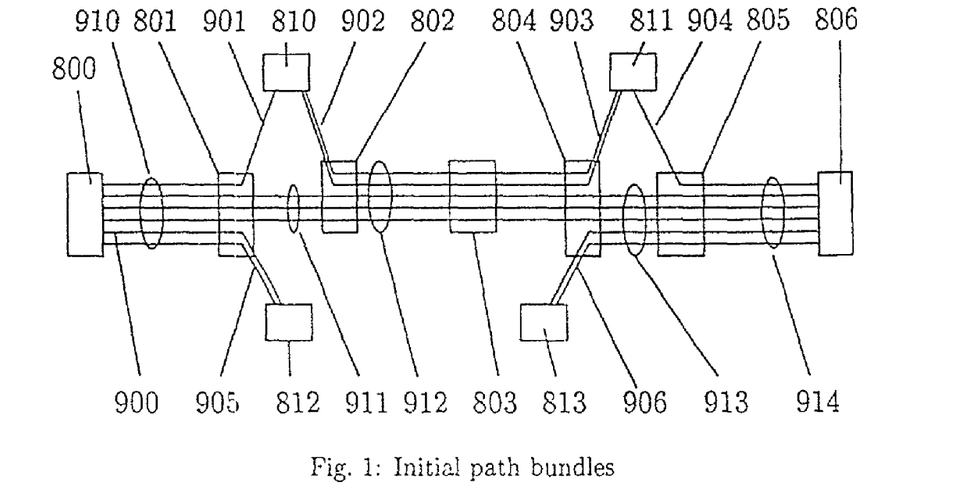
FIG. 1 shows a sample network of switches and virtual paths between the switches according to an embodiment of the present invention.
Figure 3:
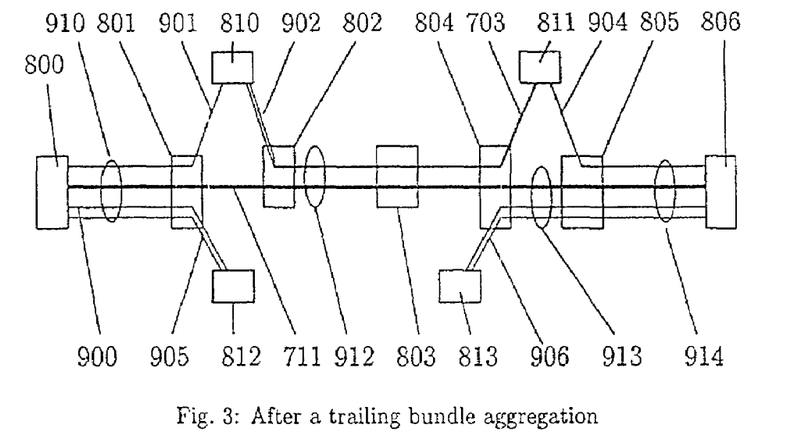
FIG. 3 shows the virtual paths of the network of FIG. 2 after a second round of association signaling and tunnel capture by an intermediate switch, according to an embodiment of the present invention.

The effect of a similar association signal initiated by the intermediate switch [802] for the path set [912] is shown in FIG. 3, to particularly illustrate that the paths identified by an association signal do not have to begin at the issuing switch, as may be incorrectly inferred from FIGS. 1 and 2. After the path set splits at switch [804], the largest subset is [903] going to switch [811], and the only remaining path is the tunnel [711], for which further aggregation does not make sense. Accordingly, subset [903] is the only subset eligible for further propagation of the association signal, and when the corresponding aggregation response signal returns, via switches [811], [804] and [803], in that order, bearing the index of a newly created second tunnel [703], switch [802] issues the finalization signal aggregating the path set [903] into this second tunnel [703], as shown.

Figure 4:
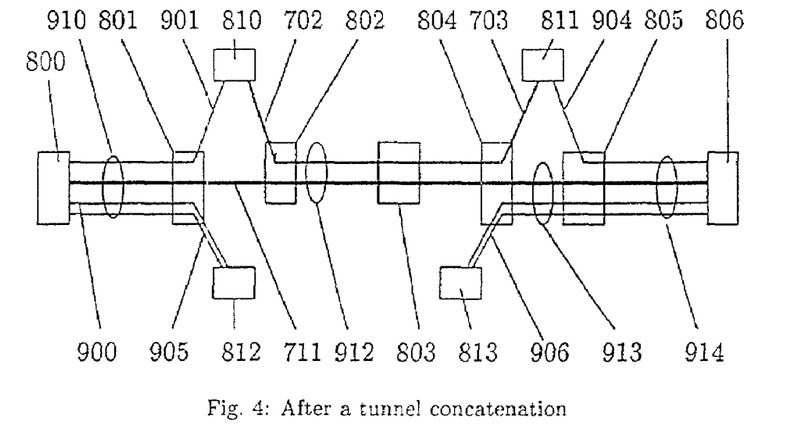
FIG. 4 shows the virtual paths of the network of FIG. 3 after a third round of association signaling and tunnel capture, according to an embodiment of the present invention.

FIG. 4 illustrates how a tunnel is grown backwards when an association signal initiated upstream arrives at a switch where the referenced set of paths is already aggregated to that tunnel. When an association signal for path set [902] arrives at switch [802] from switch [810], switch [802] must terminate the signal because all of the paths in the path set [902] are already redirected to tunnel [703]. In this case, switch [802] simply returns its incoming index for the tunnel [703], instead of allocating a new path table entry, as the extra index in its aggregation response to switch [810]. Each of switch [810] and its predecessors on the path of the path set [902] processes the aggregation signal as before, allocating a new path table entry extending the tunnel [703]. Once the finalization signaling is finished, what is left as the result is a backward extension [702] of the existing tunnel [703].

This still leaves one subset, [905], from the first switch [800], to be aggregated, for which switch [800] can now issue a second association signal to switch [801], which gets forwarded to switch [812] and onwards until terminated. When the corresponding aggregation response eventually arrives back at switch [800], a finalization signal is sent out that aggregates the subset [905] into a second tunnel [705], as shown in FIG. 5.

Figure 5:
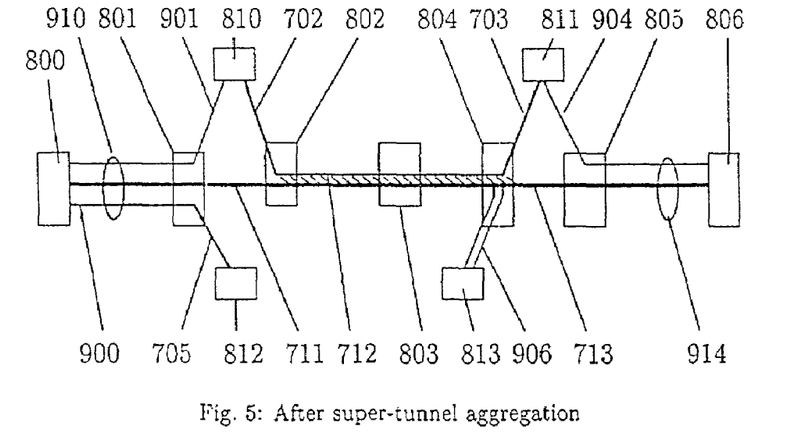
FIG. 5 shows the virtual paths of the network of FIG. 4 after all rounds of association signaling and tunnel capture by the leftmost switch, according to an embodiment of the present invention.
Figure 6:
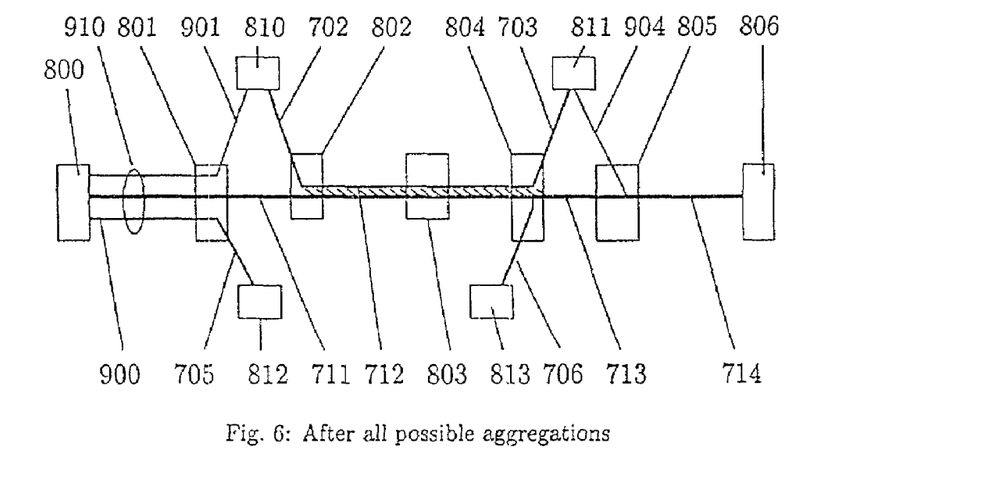
FIG. 6 shows the virtual paths of the network of FIG. 1 after all rounds of association signaling and tunnel capture, according to an embodiment of the present invention.

FIG. 5 depicts two further aggregations illustrative of the present invention. The first concerns path set [913], which comprises the virtual paths of path sets [911] and [906] between switches [804] and [806], and illustrates "tail-merger" optimization, wherein the paths from path set [906] are simply redirected at switch [804] to tunnel [711] just constructed for path set [911], since the requisite decapsulation is already established by tunnel [711] at switch [806]. The second aggregation is of the superset [912], comprising tunnels [703] and [711], between switches [802] and [804], and illustrates the nested tunneling particularly needed for achieving the logarithmic reduction of switching state (or path table size) envisaged in the present invention.

The aggregation of path set [913] is achieved when switch [804] issues an association signal for it to the next switch [805], which passes the signal onwards to switch [806] where it is terminated, as assumed for the present discussion. The opportunity for tail-merger is detected by switch [806], since the path set [913] and its included tunnel [711] both terminate at switch [806]. The switch then issues an aggregation response signal back to the preceding switch [805] bearing its incoming path index for tunnel [711] as the extra index, and an indication that the extra index corresponds to an existing tunnel. Switch [805] accordingly does a reverse lookup to obtain the path table entry for the tunnel, and inserts its corresponding incoming path index as the extra index when passing the signal onwards to switch [804], where the extra index is once again used for reverse lookup to identify the existing path table entry for tunnel [711], and the paths of the path set [906] are simply redirected to the looked up entry before issuing the corresponding finalization signal, in which the index of tunnel [711] should not be included as its path table entries are not to be deleted at the downstream switches [805] and [806].

Aggregation of the super path set [912] occurs when switch [802] issues an association signal for the path set to the next switch [803], which forwards it to switch [804]. The path set splits at switch [804] into singleton paths [703] and [711], hence the switch terminates the association and returns an aggregation response creating a new tunnel [712] for the path set. When the finalization signaling completes, what is left is a single path [712] between switches [802] and [804], shown by the shading in the figure.

An additional aggregation still possible is that of path set [906], which is already redirected to the tunnel [711] at switch [804]; this would be useful provided the path set traverses one or more switches beyond [813] in the reverse direction, and would occur when one of these switches issues an association signal for this path set. The result would be a backwards extension [706] of the existing tunnel [711] from switch [804] through switch [813], illustrating branching in the backward growth process.

Another aggregation opportunity that can arise in this sample scenario is for the path set [914], comprising a singleton path [904] and the tunnel [713], which is exactly the same as the tunnel [711] but carrying the additional traffic from the branch extension [706] just described, happen to go beyond switch [806]. This would occur if there were already a tunnel starting at switch [806] and proceeding right of it when the original path set [911] was aggregated, so that tunnel [711] would be a backward extension of that tunnel. The only difference to the preceding discussion is that it would have been a switch to the right of switch [806], instead of switch [806] itself, which would have detected the tail-merger opportunity for the path set [906] and issued the corresponding aggregation response signal bearing the indication to reuse the tunnel [711]. In this modified scenario, yet another tail-merger optimization would occur if the singleton path [904] continues beyond the end of the tunnel [713], so that the latter would now carry the traffic of [904] as well to the right of switch [805]. This enhanced tunneling is indicated as [714] in the figure. On the other hand, if the path [904] diverges or terminates at some switch to the right of switch [806] before the end of the tunnel [713], a super-tunnel would be constructed between switch [805] and this other switch.

The association-aggregation process will now be described in detail, including the more complex case in which the path set [906] is composed of two two-way paths, each comprising a pair of virtual paths in each direction, and the association is terminated, as assumed earlier, at switch [806]. The logical switch-to-switch linkages defined by these paths between the virtual path tables [613], [604], [605] and [606] within the switches [813], [804], [805] and [806], respectively, are indicated by the arrows in FIG. 7, and the path table entries are shown in the format <next switch table>:<outgoing index> and the path indices have been assigned at similar offsets in each of the tables for visual clarity. It would be clear to one skilled in the art of switched networks that the switch table references could be represented in a given implementation by port addresses, switch ids, or pointers to the related data structures. Thus, when switch [804], to which table [604] belongs, receives a message with incoming path index 44, it will index to the forty-fifth entry (counting from zero) in table [604], which says 605:45, meaning that the message should be forwarded to switch [805], which owns table [605], with the outgoing index set to 45.

Figure 7:
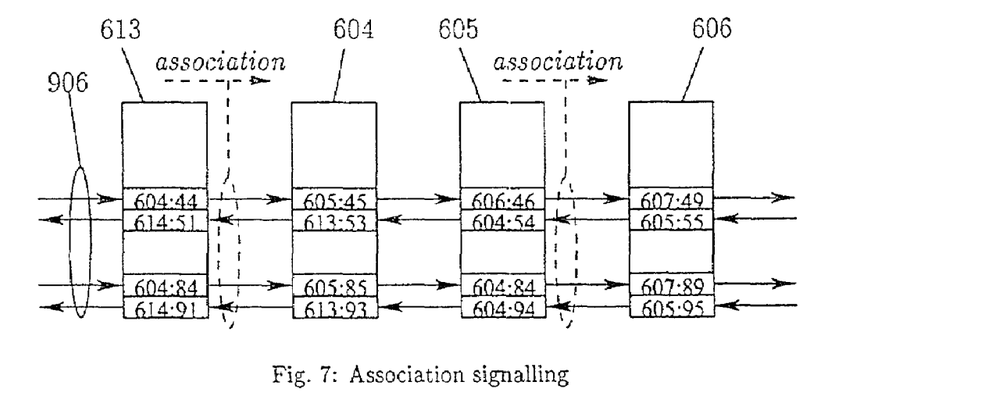
FIG. 7 illustrates propagation of an association signal with respect to the virtual path tables within the switches of the sample network of FIG. 1, according to an embodiment of the present invention.
Figure 8:
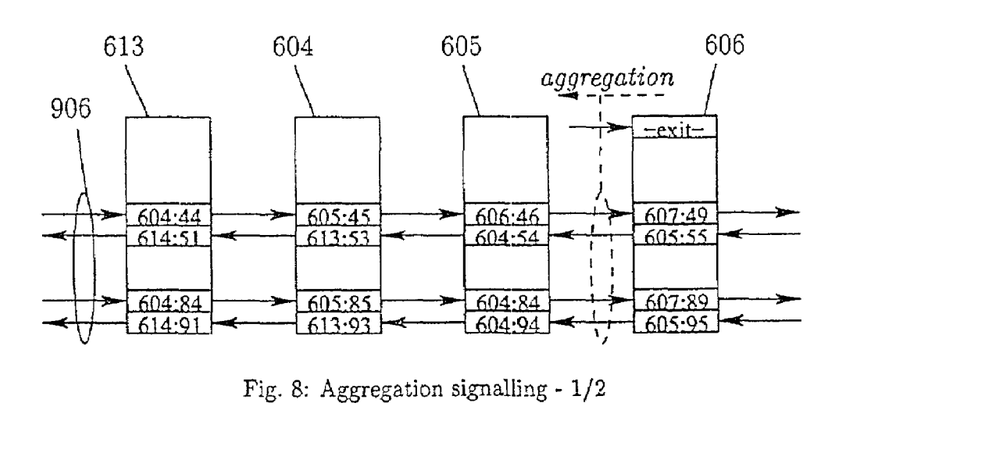
FIG. 8 illustrates generation of an aggregation response signal with respect to the virtual path tables within the switches of the sample network of FIG. 1, according to an embodiment of the present invention.

Accordingly, the association signal propagated by switch [613] to switch [604] will contain the outgoing indices 44 and 84 for the forward paths in the typical format:

opcode nh np indices where the opcode Asoc, numerically encoded, indicates that the message is an association control signal, nh is the (forward) hop count initialized to zero at the originating switch, and np is the number of path indices in the body of the signal. When this signal arrives at switch [804], the switch [804] obtains the onward indices 45 and 85, respectively, from its path table entries indexed by the received indices. The path set remains intact because both paths identify the same next switch [805], as the table reference [605], and switch [804] therefore forwards the association signal to switch [805] with the new list of indices, incremented hop count, and the predecessor switch identity, as:

Identical processing occurs at switch [805], resulting in the arrival of the association signal bearing the path stack constructed in the process:

path stack at switch [806], which terminates the signal as assumed, and returns an aggregation response to switch [805], as illustrated in FIG. 8, carrying a new incoming path index 06 as an extra index (ei) to be used for the tunnel, a reverse hop count (nrh) initialized to the forward hop count (two in this example) for combined use as the path stack index, and a copy of the received indices, as:

nrh ei where the opcode Aggr is again numerically encoded. Switch [805] likewise allocates a new path table entry with the next switch reference ([606]) and the received ei as the onward index, replaces the ei field in the aggregation signal with the incoming index to the new entry (05), does a reverse lookup of the forward path indices, obtaining the corresponding incoming indices 45 and 85, replaces the first set of the reverse path indices by the corresponding outgoing indices from its path table, and "pops" the path stack, decrementing the reverse hop count and obtaining the pre decessor switch identity [804], to which it returns the modified aggregation signal:

$$\begin{bmatrix} \text{Aggr} & 2 & 2 & 1 & 05 & 4585 & 4686 & 813 \end{bmatrix}$$

Figure 9:
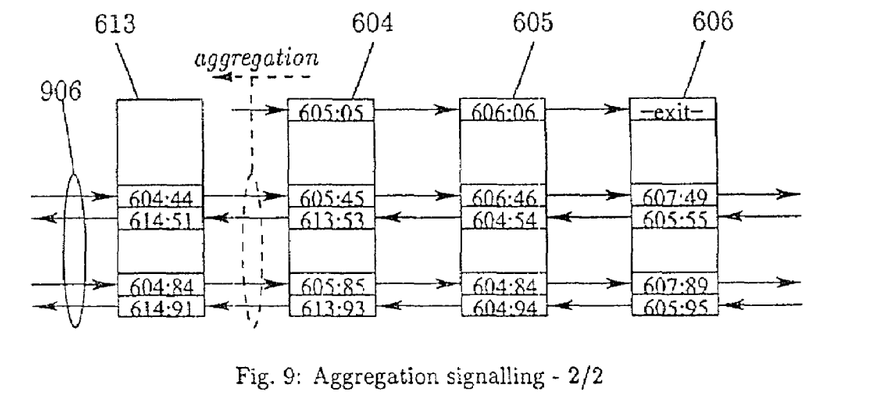
FIG. 9 illustrates propagation of an aggregation response signal with respect to the virtual path tables within the switches of the sample network of FIG. 1, according to an embodiment of the present invention.

Switch [804] does identical processing, resulting in the path table entries for the forward tunnel as shown in FIG. 9, and in the delivery of the aggregation signal:

$$\begin{bmatrix} \text{Aggr} & 2 & 2 & 0 & 04 & 4484 & 4686 \end{bmatrix}$$

to switch [813], where the signal is terminated because the reverse hop count is zero. It would be observed that the two lists of indices received in effect define the mapping from the immediate outgoing indices for the forward paths to the final outgoing indices for the same paths at the terminating switch. The latter set of indices are the ones needed for redirecting the forward paths through the tunnel, and the aggregation response thus serves to percolate the tunnel exit switch indices back to the entry switch, in addition to constructing the tunnel path.

The processing described so far would be applicable to both one-way and two-way path sets, as only the forward paths have been used for the signaling. With two-way path sets, however, the predecessor information is available from the reverse paths, so that the path stack, which could become unwieldy especially for long path sets going over many hops, can be avoided. This would entail including the reverse path indices in the association signal, and performing reverse lookups on these and replacing them with corresponding incoming indices at each intermediate switch, unless each switch can identify the reverse path table entry corresponding to a given forward path entry. This would have to be the case in order to enable any switch to initiate association for two-way path sets in the first place. The reverse path indices do not have to be included, therefore, the association signal for the two-way path set arriving at switch [806] in the present scenario would be simply:

$$\begin{bmatrix} \text{Asoc} & 2 & 2 & 4686 \end{bmatrix}$$

and switch [806] would be able to identify the associated reverse path entries and construct the modified aggregation response bearing any one of the reverse path indices (rpi), in place of the entire path stack, as:

$$\begin{bmatrix} \text{Aggr} & 2 & 2 & 2 & 55 & 06 & 4686 & 4686 \end{bmatrix}$$
$$\quad\quad\quad\quad\quad\quad\quad \text{nrh} \quad \text{rpi} \quad \text{ei}$$

Switch [805] would be able to identify switch [804] as the predecessor by indexing to this reverse path entry in its own table [605], and would replace the rpi field with the onward index 44 to enable the predecessor switch [804] to repeat the procedure. The aggregation response arriving at switch [813] would then be:

$$\begin{bmatrix} \text{Aggr} & 2 & 2 & 0 & 51 & 04 & 4484 & 4686 \end{bmatrix}$$

where the rpi value is no longer needed. In existing networks, every switch can be assumed to possess a unique id, and in principle, this could be used to determine the reverse path from the routing tables instead of the path stack or rpi, but the routing would impose additional computational overhead on the switches. Moreover, a managed global id space would not be available in addressless internetworking, so the approach would not be sufficiently general. The more critical problem, however, is that in general, it cannot be guaranteed that the reverse route so found would correspond the path set path. Accordingly, the rpi, or the path stack in the case of one-way paths, is necessary.

The next stage is the aggregation finalization, which begins with the first switch, [813] in the present example, processing the received aggregation response from the next switch, [804], in the path set path. Like the downstream switches [806], [805] and [804], switch [813] allocates a new path table entry for the tunnel, inserting in it the next switch reference ([604]) and the received extra index (04). It then processes the first list of path indices in the received signal, indexing to the forward path table entries, replacing the index values with the corresponding values from the second list, and finally, replacing the next switch reference therein with that of the local path table entry for the tunnel. In the present example, this means looking up the path table entries corresponding to incoming indices 44 and 84, and replacing them with the values 46 and 86, respectively, and changing the destination references from [604], corresponding to the next switch [804], to *03, where the '*' notation signifies redirection to the local path table index 03.

Figure 10:
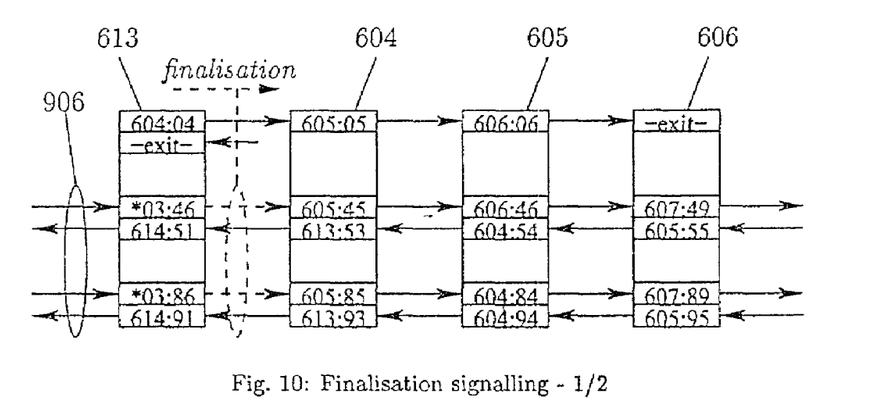
FIG. 10 illustrates generation of an aggregation finalization signal with respect to the virtual path tables within the switches of the sample network of FIG. 1, according to an embodiment of the present invention.
Figure 11:
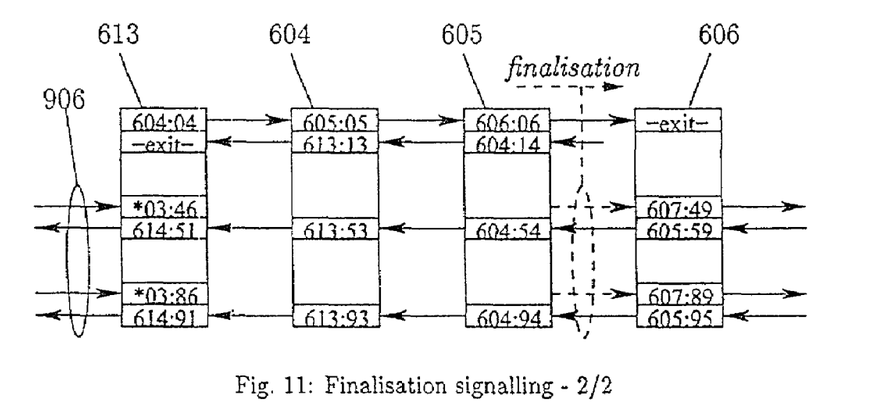
FIG. 11 illustrates propagation of an aggregation finalization signal with respect to the virtual path tables within the switches of the sample network of FIG. 1, according to an embodiment of the present invention.
Figure 12:
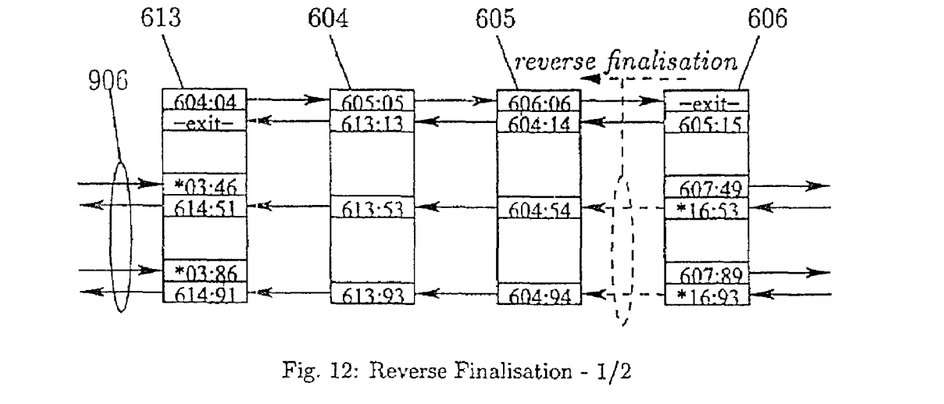
FIG. 12 illustrates generation of an reverse finalization signal with respect to the virtual path tables within the switches of the sample network of FIG. 1, according to an embodiment of the present invention.

The modified finalization signal appropriate for the two-way paths is assembled by allocating a second new entry in its path table for use as the reverse tunnel, inserting both the received extra index and its index for the new entry as the reverse extra index rei, copying the first list of indices received in the aggregation response which identified the forward paths of the path set, adding as a second list the incoming indices for the corresponding reverse paths, and resetting the second hop count field nrh from the first, nh. The resulting finalization signal returned to the next switch [804] would be:

$$\begin{bmatrix} \text{Fin2} & 2 & 2 & 2 & 04 & 13 & 4484 & 5191 \end{bmatrix}$$
$$\quad\quad\quad \text{nh} \;\; \text{np} \;\; \text{nrh} \;\; \text{ei} \;\;\; \text{rei} \;\;\; \text{fwd} \;\;\; \text{rev}$$

where the opcode Fin2 is again numerically encoded, and the state of the switch path tables would be as shown in FIG. 10. On receiving this, switch [804] first looks up the first list of indices to identify its forward path table entries for the path set, replaces the first list with the corresponding onward indices obtained from the lookup, deletes the looked up entries as they are no longer needed, allocates a new path table entry for the reverse tunnel, inserting the preceding switch reference ([613]) and the reverse extra index (13) therein. Since nrh is non zero, the switch replaces the ei field in the finalization signal with the corresponding onward index from its path table (06), replaces the rei field with its incoming index for the newly allocated entry, does a reverse lookup for each of the reverse path indices received, replacing them with its incoming indices for the path table entries found, and forwards the resulting signal message:

$$[\text{Fin2} | 2 | 2 | 1 | 05 | 14 | 45\ 85 | 53\ 93]$$

to the next switch, [804], identified by the (deleted) forward path entries. Once again, identical processing occurs at switch [805], constructing the reverse tunnel as shown in FIG. 11, and termination is again detected by the nrh value dropping to zero when the signal arrives at switch [806]. The latter now uses the second list of indices in the received signal, which are the incoming indices to the reverse paths at switch [813], for redirecting the corresponding reverse path entries, indirectly identified by the forward path indices, to its newly allocated entry for the reverse tunnel. This second set of redirections should now be clear from FIG. 12.

Figure 13:
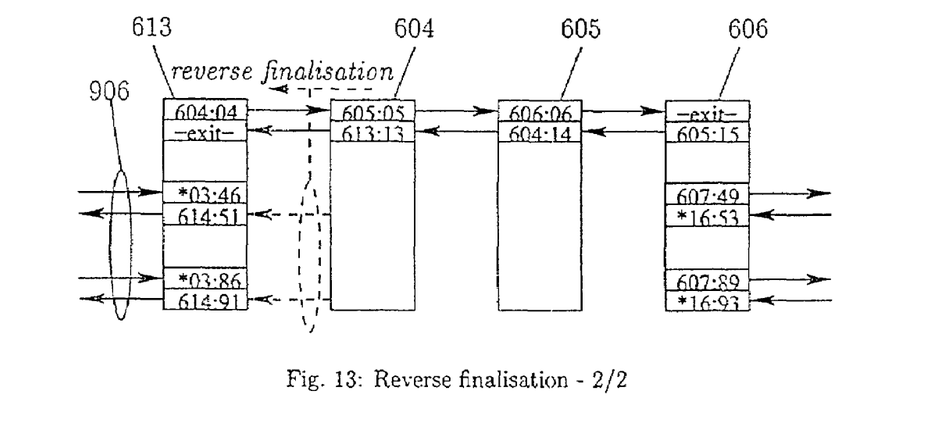
FIG. 13 illustrates propagation of a reverse finalization signal with respect to the virtual path tables within the switches of the sample network of FIG. 1, according to an embodiment of the present invention.

Switch [806] now prepares the reverse finalization signal by once again resetting the nrh field to the nh value in the received signal, deleting the forward tunnel index ei, deleting the forward path index list, and replacing the reverse path indices in the received signal with the corresponding onward indices which the switch would have presumably saved before redirecting them to the reverse tunnel. The result would be:

$$[\text{Fin1} | 2 | 2 | 2 | 15 | 55\ 95]$$
$$\quad\ \ \text{nh}\ \ \text{np}\ \text{nrh}\ \text{rei}\ \ \text{rev}$$

containing the numerically encoded one-way finalization opcode Fin1. On receiving this, switch [805] looks up the path entry indexed by rei, i.e., the reverse tunnel, to identify the preceding switch ([804]), replaces rei with the onward index found (14), looks up and replaces the reverse path indices with the corresponding onward indices (54 and 94), and then deletes these entries, decrements nrh and lastly, sends the signal to the identified preceding switch [804]. Identical processing occurs at switch [804], and the signal is terminated at switch [813] as the reverse hop count drops to zero. The resulting state of the path tables, showing the two-way tunneling clearly, is given in FIG. 13.

Figure 14:
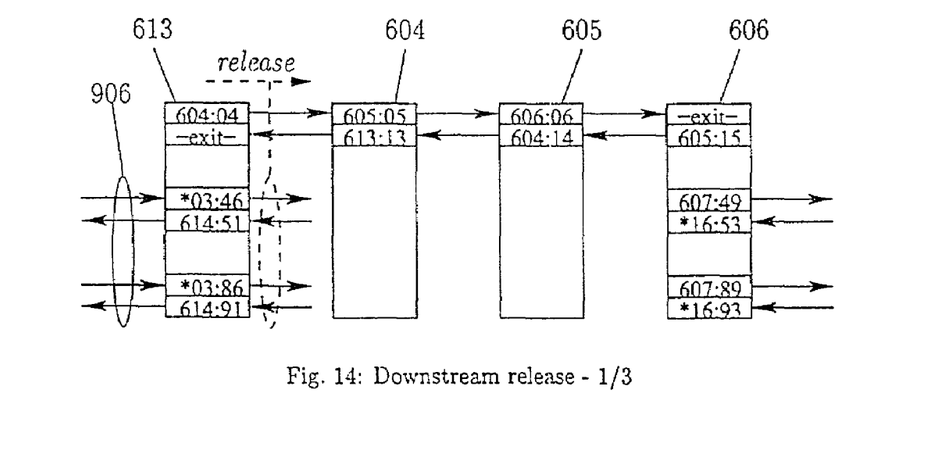
FIG. 14 illustrates generation of a two-way tunnel release signal with respect to the virtual path tables within the switches of the sample network of FIG. 1, according to an embodiment of the present invention.

Consider next the corresponding release signal issued by switch [813], which functions as both tunnel entry and exit switch for the two-way paths in the present scenario, illustrated in FIG. 14. The release signal would contain a numerically encoded opcode Rel2, the tunnel indices ei and rei from which path release is requested, the forward and the reverse path indices to be released, and a flag df indicating that the tunnels are to be deleted:

$$[\text{Re12} | 2 | 1 | 04\ 13 | 46\ 86 | 53\ 93]$$
$$\quad\ \ \text{np}\ \ \text{df}\ \ \text{ei rei}\ \ \text{fwd}\ \ \text{rev}$$

Note that a hop count is not needed because the release process would be over when one of the tunnels terminates. When switch [804] receives this signal, it first allocates new path table entries for each of the received path indices, inserts the predecessor switch reference ([613]) as the next hop destination for the new reverse path entries, inserts the received path indices as the onward indices for both sets of new path entries, redirects the new forward path entries to the forward tunnel by marking their next hop destinations as the local index of the tunnel, and marks the reverse tunnel as terminated. It should be clear from FIG. 15 that the redirection of the forward paths in switch [804] is as yet redundant, since the redirections at switch [813] are still in place. It should also be apparent that the reverse path releases cannot be partial: either the entire reverse tunnel is emptied or none at all, since the reverse tunnel must be terminated at each of the intermediate switches in order to make the new reverse path entries immediately effective. The alternative would be to defer the release acknowledgment for the reverse paths until the release processing reaches the end of the forward tunnel, and to issue a delete signal for the reverse tunnel path from that end. This would keep the switches in transience longer, and in effect entail two acknowledgments for the same release signal, and is therefore not preferred.

Figure 15:
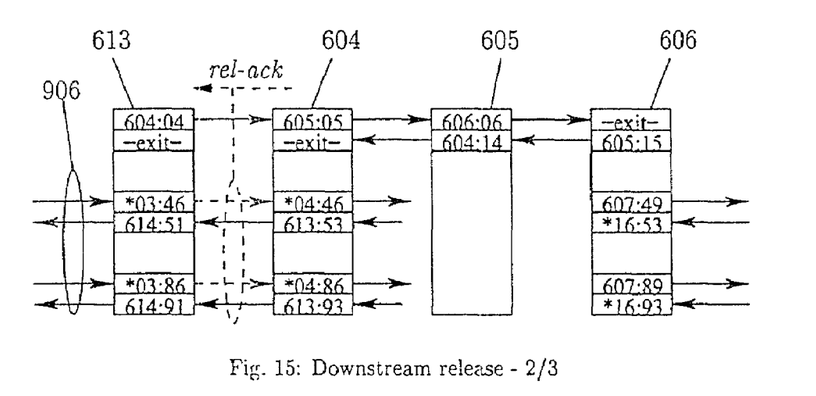
FIG. 15 illustrates propagation of a two-way tunnel release signal and its acknowledgment with respect to the virtual path tables within the switches of the sample network of FIG. 1, according to an embodiment of the present invention.

To notify switch [813] that the redundant redirections and the forward tunnel entry can be safely removed, switch [804] now issues a release acknowledgment signal comprising a numerically encoded acknowledgment opcode RelAck, the received path indices to be unlinked from the tunnel (46 and 86), and the corresponding incoming path indices (45 and 85) to be used in their place:

$$[\text{RelAck} | 2 | 46\ 86 | 45\ 85]$$
$$\qquad\ \ \ \text{np}\ \ \text{fwd1}\ \ \text{fwd2}$$

Figure 16:
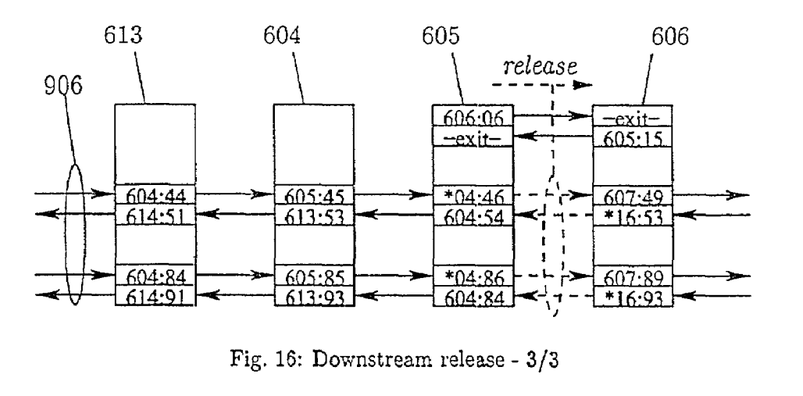
FIG. 16 illustrates onward propagation of a two-way tunnel release signal and its acknowledgment with respect to the virtual path tables within the switches of the sample network of FIG. 1, according to an embodiment of the present invention.

On receiving this acknowledgment, switch [813] sets the next hop destination for the first set of received indices fwd1 as the next switch reference ([604]), and the corresponding indices from the second set fwd2 as the onward indices for these paths. As a result of these changes, the forward paths enter the tunnel only at switch [804], and switch [813] therefore deletes its forward tunnel entry at index 03. Meantime, switch [804] also propagates the release signal onwards, with its own corresponding set of reverse path indices:

$$[\text{Re12} | 2 | 1 | 04\ 13 | 46\ 86 | 54\ 94]$$
$$\quad\ \ \text{np}\ \ \text{df}\ \ \text{ei rei}\ \ \text{fwd}\ \ \text{rev}$$

and identical processing occurs at the next intermediate switch [805], with an acknowledgment being returned to switch [804] and processed the same way thereon, resulting in state of the switches shown in FIG. 16 before the release is processed at switch [806]. When that gets completed, the result would be equivalent to the initial state shown in FIG. 1, except that the newly allocated path table entries would likely have different indices.

It would be clear from the foregoing description that the present invention potentially achieves scalability of switching in connection-oriented networks comparable to that of IP routing, by providing automatic aggregation of switch state information, whereas an analogous automatic aggregation of IP addresses and routes is currently impossible. Moreover, a high degree of aggregation can be continuously maintained even as the connections evolve, because the discovery and aggregation signals literally follow the connections that they aggregate, can be independently and simultaneously applied at a multitude of switches and would be invoked periodically. As remarked, the higher levels of aggregation become increasingly representative of network state, so that the automatic aggregation procedure of the present invention in effect scale the network itself, potentially reducing the signaling latency and traffic as well. One way the Internet can continue to grow is to periodically change the entire infrastructure to widen the address space, as being currently attempted in the migration to IPv6, which testifies to the inherent inscalability of IP routing and will likely be more difficult the next time around, or to involve some form of relative addressing, as in the Nimrod and the IPNL proposals. Connection-oriented networks involve relative addressing at the hop level, since the virtual path indices are in effect local next hop addresses, and though the automatic aggregation procedure has been particularly described with respect to virtual paths, it would be clear that it may be analogously applied to other forms of relative addressing as well.

Having described embodiments of a system and method for a self-scaling network, it is to be noted that modifications and variations can be made by persons skilled in the art in light of the above teachings. For example, the merging of parallel tunnels can be performed downstream at an intermediate switch, the upstream portions subsequently merged starting from the first switch. It is therefore to be understood that changes may be made in the particular embodiments of the invention disclosed which are within the scope and spirit of the invention as defined by the appended claims. Having thus described the invention with the details and particularity required by the patent laws, what is claimed and desired to be protected by Letters Patent is set forth in the appended claims.

What is claimed is:

1. A method for the automatic aggregation of a plurality of virtual paths emanating from a first switch, comprising the steps of:
    discovering, automatically, portions of the virtual paths that run parallel to one another;
    constructing a first tunnel along parallel virtual paths between the first switch and a terminating switch; and
    aggregating the parallel virtual paths into the first tunnel,
    wherein the step of discovering further comprises,
    selecting, at the first switch, an initial set of paths emanating from the first switch to a common second switch,
    issuing an association signal at the first switch to the second switch, including a list of indices of the paths included in the initial set of paths,
    propagating the association signal at the second switch and each of zero or more successive switches commonly traversed by the set of paths until at least a specified minimum number of paths diverge from the initial set of paths, and
    identifying a remainder of the set of paths as a candidate set and a final switch reached as the terminating switch for the set of paths.

2. The method of claim 1, further comprising the steps of:
    deleting indices corresponding to the diverged paths from the list of indices;
    incrementing a forward hop count included in the association signal at each of the successive switches; and
    initiating tunnel path construction upon a final value of the forward hop count at the terminating switch being above a specified minimum.

3. The method of claim 1, wherein the step of constructing the first tunnel further comprises the steps of:
    allocating a path table entry for the first tunnel at the terminating switch;
    composing, at the terminating switch, an aggregation signal including a final forward hop count and a list of path indices received in an association signal, a list of outgoing path indices corresponding to the list of path indices, and a reverse hop count initialized to zero; and
    propagating the aggregating signal in reverse through each preceding switch in succession until reaching the first switch.

4. The method of claim 3, further comprising the steps of:
    incrementing the reverse hop count at each preceding switch to determine arrival at the first switch by comparing the reverse hop count with the final forward hop count;
    performing, at each preceding switch, a reverse lookup of the list of indices received in the aggregation signal to identify corresponding incoming virtual paths;
    replacing the list of indices received with a list corresponding list to the incoming virtual paths;
    allocating, at each preceding switch, an additional path table entry for the first tunnel;
    assigning the list of indices received, including the additional path table entry, as an outgoing index and the next preceding switch from which the aggregation signal was received as the next preceding switch for the additional path table entry;
    replacing the list of indices received, including the additional path table entry, the list of indices received, including the additional path table entry; and
    initiating aggregation of the candidate set of paths into the constructed tunnel upon arrival at the first switch.

5. The method of claim 1, wherein the step of aggregating the parallel virtual paths into the first tunnel further comprises the steps of:
    allocating at the first switch a path table entry for the first tunnel and marking path table entries corresponding to a first list of indices received in an aggregation signal as redirected to an additional tunnel path;
    replacing outgoing indices for marked entries with corresponding indices from a second list received in the aggregation signal;
    composing an aggregation finalization signal, including the first list of indices, a received final forward hop count and a received reverse hop count; and
    propagating the aggregation finalization signal through each successive switch to the terminating switch.

6. The method of claim 5, further comprising the steps of:
    replacing a received list of indices at each successive switch with corresponding outgoing indices; and
    discarding the path table entries identified by the received list of indices at each successive switch other than the terminating switch.

7. The method of claim 1, wherein the discovery, tunnel construction and aggregation are performed recursively treating the tunnels as candidates for further aggregation.

8. The method of claim 1, wherein the discovery, tunnel construction and aggregation are performed periodically, maintaining an overall degree of aggregation and table size reduction as the virtual paths are closed and new virtual paths are opened by end system applications.

9. The method of claim 1, wherein upon a network including a second tunnel at the terminating switch to which all virtual paths emerging from the first tunnel are redirected at the terminating switch, further comprising the step of concatenating the second tunnel to the first tunnel.

10. The method of claim 9, wherein the step of concatenating further comprises the steps of:
marking the first tunnel as redirected into the second tunnel; and
discarding path table entries for the emerging paths at the terminating switch.

11. The method of claim 1, further comprising the steps of:
saving a reverse hop count at each intermediate switch and the first switch as a measure of the length of a remaining portion of the first tunnel; and
merging at least two tunnels starting at the first switch by redirecting at least a second tunnel in a candidate set of paths to the first tunnel, upon determining the candidate set of paths to include tunnels of equal length according to the saved hop counts.

12. The method of claim 9, wherein a two-way connection is represented by pairs of virtual paths in opposite directions, further comprising the steps of:
allocating, at each intermediate switch, a second path table entry for a reverse tunnel;
initiating aggregation of reverse paths at the terminating switch by issuing a reverse finalization signal message including a list of indices for the reverse paths; and
propagating the reverse finalization signal back to the first switch.

13. The method of claim 1, further comprising the step of initiating a release signal, releasing aggregated paths from a tunnel path, upon determining that a switch issuing the release signal, a peer switch connected to the switch issuing the release signal to release the tunnel and each intermediate switch have path table space to accommodate a plurality of component paths individually.

14. The method of claim 13, wherein the release signal includes an outgoing index for a tunnel path, a list of outgoing indices for a plurality of component paths, and an indication whether the first tunnel is to be discarded after the release.

15. A method for automatic release of aggregated paths from a tunnel path upon determining at a tunnel entry switch that each intermediate switch traversed by the tunnel path has path table space for accommodating each of the aggregated paths individually, comprising the steps of:
initiating at the tunnel entry switch a release signal including a list of outgoing indices of virtual paths that are initially redirected to the tunnel path at the entry switch;
propagating the release signal successively to each switch along the tunnel path;
allocating at each of the successive switches a path table entry for each index listed in the release signal and setting the outgoing index and next switch for that entry with the listed index and the next switch on the tunnel path, respectively;
returning an acknowledgment signal to a preceding switch from which the release signal was received, the acknowledgment signal comprising the received list together with the list of indices of the allocated path table entries in the same order; and
replacing, at the preceding switch, the outgoing index for each path table entry identified by a first list in the received acknowledgment with the corresponding index from a second list in the acknowledgment signal.

16. The method of claim 15, further comprising the steps of:
including a discard indication flag in the release signal; and
deallocating the tunnel path table entry at each of the successive switches in an event that the discard indication flag is set.

17. A method for automatic release of aggregated paths from a tunnel path, upon determining at a tunnel exit switch that each intermediate switch traversed by the tunnel path has path table space to accommodate each of the aggregated paths individually, comprising the steps of:
initiating at the tunnel exit switch a reverse release signal comprising a list of incoming path indices for virtual paths emerging from the tunnel;
propagating the reverse release signal successively to each preceding switch along the tunnel path; and
allocating at each of the preceding switches except the tunnel entry switch a path table entry for each index listed in the reverse release signal and setting the outgoing index and next switch for that entry with the listed index and the next switch on the tunnel path, respectively.

18. The method of claim 17, further comprising the steps of:
including an optional discard indication flag in the reverse release signal;
returning the discard indication flag in an acknowledgment signal to the next switch from which the reverse release signal was received; and
deallocating at the next switch the tunnel path table entry on receipt of this indication in the acknowledgment signal.

19. A method for the automatic aggregation of a plurality of virtual paths emanating from a first switch, comprising the steps of:
discovering, automatically, portions of the virtual paths that run parallel to one another;
constructing a first tunnel along parallel virtual paths between the first switch and a terminating switch; and
aggregating the parallel virtual paths into the first tunnel, wherein the step of constructing the first tunnel further comprises,
allocating a path table entry for the first tunnel at the terminating switch,
composing, at the terminating switch, an aggregation signal including a final forward hop count and a list of path indices received in an association signal, a list of outgoing path indices corresponding to the list of path indices, and a reverse hop count initialized to zero, and
propagating the aggregating signal in reverse through each preceding switch in succession until reaching the first switch.

* * * * *